June 8, 1948.  C. C. FUERST  2,443,159

SHUTTER DUST COVER

Filed Aug. 7, 1946

CARL C. FUERST
INVENTOR

BY
ATTORNEYS

Patented June 8, 1948

2,443,159

UNITED STATES PATENT OFFICE 2,443,159

SHUTTER DUST COVER

Carl C. Fuerst, Rochester, N. Y., assignor to Eastman Kodak Company, Rochester, N. Y., a corporation of New Jersey Application August 7, 1946, Serial No. 688,837

6 Claims. (Cl. 74—566)

This invention relates to photography, and more particularly to dust covers for camera shutters. One object of my invention is to provide a closure for a slot in a shutter cover through which a shutter lever passes. Another object of my invention is to provide a closure which is spring actuated and which moves to normally cover a shutter slot; the arrangement of the parts being such that the closure offers but little, if any, resistance to the movement of the lever. Other objects will appear from the following specification, the novel features being particularly pointed out in the claims at the end thereof.

In shutters, and particularly in shutters of the setting type in which a lever is moved to tension a shutter spring, it is customary for the lever to move through a slot in an edge wall of a shutter casing and this slot usually permits dust or dirt to enter, but in the past it has been difficult to provide a satisfactory slot cover because anything which impedes the movement of a shutter-setting lever will affect the speed of the shutter. Because of the length of the slot through which the setting lever usually must move, the slot provides rather a large opening through which moisture, dust, and dirt can ordinarily pass. My invention is particularly directed to a means for covering the slot which will at the same time permit free movement of the lever through the slot. While, of course, my invention may be applied to any photographic shutter to cover any slot through which a shutter-operating lever may pass, it is particularly adapted for use in a shutter of the type shown in U. S. Patent No. 2,099,866, Riddell, Photographic shutter, granted November 23, 1937. In this patent, the setting lever projects radially through a shutter slot and moves through a considerable angle in setting the shutter. My improved form of dust cover is therefore particularly suitable for such a structure.

Coming now to the drawings in which like reference characters denote like parts throughout:

Figure 1:
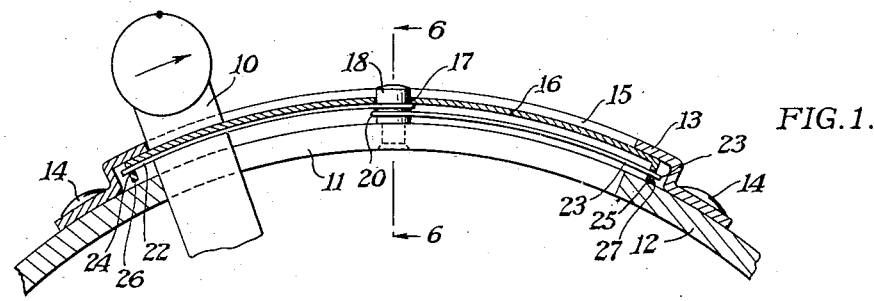
Fig. 1 is a section through a portion of a shutter casing, there being a shutter cover extending across a slot constructed in accordance with and embodying a preferred form of my invention.

My invention comprises broadly providing an extremely thin, light-weight, metal cover, mounted to slide under the influence of a very light spring into a slot-covering position. The plate may move freely from this position to permit the shutter to be set and an exposure made.

More specifically, my invention may be applied to a shutter 1, having a central aperture 2 into which a lens cell 3 may be attached. There is, preferably, a pointer 4 for indicating the shutter speed setting on a scale 5 carried by an adjustable rim 6. A diaphragm scale 7 of the usual type may be employed and a pointer 8 is used to designate the diaphragm setting. A trigger 9 extends through the shutter casing and a setting lever 10 passes outwardly through a slot 11 in the upstanding circular wall 12 of the shutter. The shutter mechanism may be exactly the same as the mechanism shown in the above-mentioned Riddell patent.

Figure 5:
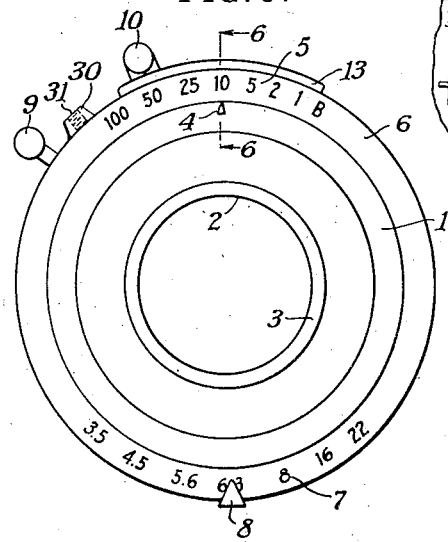
Fig. 5 is a front plan view of a shutter equipped with my improved type of dust cover.
Figure 6:
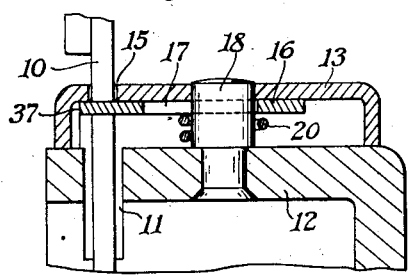
Fig. 6 is an enlarged fragmentary sectional view taken on line 6—6 of Fig. 5.

On the top of the shutter, as viewed in Fig. 5, I provide a casing 13 which is a formed metal plate which may be attached as by rivets, or screws, 14, to the wall 12 of the shutter; this casing having a slot 15 lying directly above the slot 11 in the shutter wall 12, as best shown in Fig. 6. I prefer to make the slot 15 just wide enough for the lever 10 to pass freely therethrough. Inside of the casing 13 I provide a dust cover 16, this cover being curved to conform with the arcuate shape of the housing 13 and including a slot 17 through which a rivet 18 passes, as best shown in Fig. 6. This pin and slot forms a movable connection on which the dust cover 16 can slide and turn within the limits of the housing 13.

Figure 2:
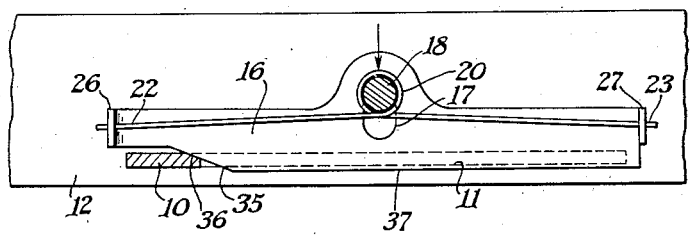
Fig. 2 is a top plan view of the shutter cover shown in Fig. 1 but with portions removed. In this figure the shutter cover is in its normal position of rest and the shutter-setting lever is in the position it assumes after an exposure has been completed.
Figure 4:
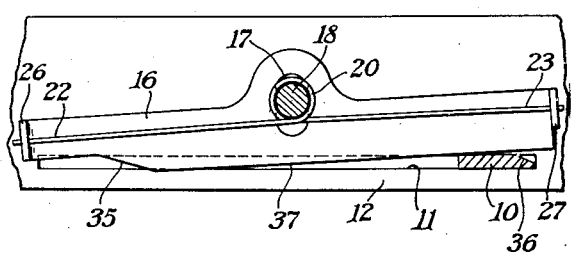
Fig. 4 is a view similar to the preceding Figures 2 and 3, but with the parts in a position in which the shutter is fully set.

In order to hold the dust cover 16 normally over the slot 11 and beneath the slot 15, I provide a light-weight spring 20 which is looped about the rivet 18, as shown in Figs. 2 and 6, the two ends of this spring 22 and 23 passing through notches or apertures 24 and 25 in the flanges 26 and 27 which are formed on the end of the cover member. This spring, as shown in Fig. 2, normally presses the dust cover in the direction shown by the arrow. When in a normal rest position, the dust cover 16 completely covers the slots 11 and 15, except for an extremely small area adjacent the trigger. The dust cover is provided with a cam surface 35 which, in a rest position, lies adjacent a complementary-shaped cam 36 formed on the setting lever 10. The straight edge 37 of the dust cover may engage the cam 36 during the setting movement and it may also engage the setting lever 10 when in a fully-set position, as shown in Fig. 4.

Figure 3:
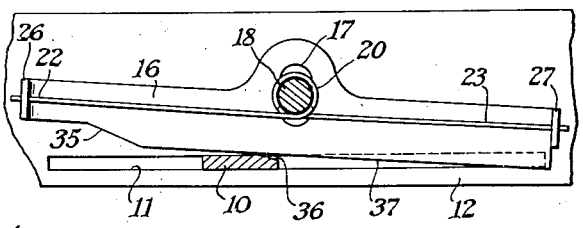
Fig. 3 is a view similar to Fig. 2 but with the parts in the position they assume when the shutter is being set.

With the parts in their rest position, shown in Fig. 2, the shutter may be set by moving the setting lever 10 in the direction shown by the arrow in Fig. 1. This causes the cam 36, through engagement with the cam 35, to rock and move the dust cover 16 rearwardly as the lever 10 progresses from its Fig. 2, past its Fig. 3, and into its Fig. 4 position. In this position the shutter is set and it may be released by depressing the shutter trigger 9. It is important that the setting lever 10 move freely from its Fig. 4 to its Fig. 1 position, because the speed of movement of the setting lever 10 determines the speed of the exposure and any interference with this movement will alter the shutter speed. As will be seen from Fig. 4, the relationship between the setting lever 10 and the lower edge 37 of the dust cover is such that the lever 10 has considerable mechanical advantage and can readily move the dust cover; this being particularly true because of the extremely light-weight spring 20 which moves the dust cover. Thus, the dust cover will slide and rock about the rivet 18 and there will be little, if any, retarding action on the setting lever. When the setting lever reaches its Fig. 2 position, the cover may move forwardly into a slot-closing position, so that the dust cover forms an adequate cover for the slot 11 in the shutter flange 12 and for the slot 15 in the housing 13. Dust and dirt are therefore prevented from entering this relatively-long slot.

While I have shown my invention as applying to the setting lever slot of a shutter of known type, because these slots are usually the longest, it is obvious that a similar construction may be used on any slot through which a lever passes from the shutter mechanism outwardly and into an operative position. It is, however, a simple matter to provide a release, or a trigger, which does not require a slot, or, if desired, the shutter may be operated solely through a cable release attached to a ferrule 30, as shown in Fig. 5; this ferrule being threaded at 31 to receive a cable release. In such a case, the trigger 9 may be omitted with the omission also, of course, of a slot through which the trigger passes. In such a case there will be no slots in the shutter casing through which dust or dirt can pass.

I claim:

1. In a camera shutter, the combination with a slotted arcuate wall forming a part of a shutter casing, a lever movable through the slot, a slot cover comprising a plate curved to fit the arcuate wall, a pin-and-slot connection between the cover and shutter casing the slot extending transversely of the arcuate wall on which said cover may have limited movement to and from the slot, a light spring normally holding an edge of the cover over the slot, a cam on the cover edge lying over the slot toward one end thereof and lying in the path of the lever, whereby said lever may move the cover, rocking it upon the pin-and-slot connection when said lever is moved toward the opposite end of the slot.

2. In a camera shutter, the combination with a slotted arcuate wall forming a part of a shutter casing, a lever movable through the slot, a slot cover comprising a plate curved to fit the arcuate wall, a pin-and-slot connection between the cover and shutter casing the slot extending transversely of the arcuate wall on which said cover may have limited movement to and from the slot, a light spring normally holding an edge of the cover over the slot, a cam on the cover edge lying over the slot toward one end thereof and lying in the path of the lever, whereby said lever may move the cover, rocking it upon the pin-and-slot connection when said lever is moved toward the opposite end of the slot, said lever remaining under an edge of the cover at the opposite end of the slot whereby the cover may be rocked about its pin-and-slot connection in returning to its original position.

3. In a camera shutter, the combination with a slotted arcuate wall forming a part of a shutter casing, a lever movable through the slot, a slot cover comprising a plate conforming to the shape of the arcuate wall, a pin-and-slot connection between the cover and shutter casing, the slot extending transversely of the arcuate wall on which said cover may have limited movement to and from the slot, a light spring normally holding an edge of the cover over the slot, a cam on the cover edge lying over the slot toward one end thereof and lying in the path of the lever, whereby said lever may move the cover in moving in one direction, rocking it upon the pin-and-slot connection away from the slot when the lever is moved through the slot, said lever moving through the slot in said one direction and tensioning the light spring as the cover is moved; an edge of the cover resting against the lever throughout its movement through the slot whereby the lever, after moving the cam on the cover edge, may engage the cover and may move without material resistance due to the pressure of the cover on the lever.

4. The camera shutter of the type defined in claim 3 characterized by said cover lying within a frame extending around at least three sides of the slot in the cover.

5. The camera shutter of the type defined in claim 3 characterized by said cover including fingers on the ends of the cover, each engaging one end of said cover spring, said cover spring encircling the pin of said pin and slot supporting the cover on the shutter.

6. The camera shutter of the type defined in claim 3 characterized by said cover cam normally lying against a complementary cam carried by the lever to facilitate rocking the cover on its pin-and-slot connection during movement of the lever in one direction.

CARL C. FUERST.

REFERENCES CITED

The following references are of record in the file of this patent:

UNITED STATES PATENTS

| Number | Name | Date |
|---|---|---|
| 952,643 | Roche | Mar. 22, 1910 |
| 1,037,631 | Jones | Sept. 3, 1912 |
| 2,331,569 | Perwitz | Oct. 12, 1943 |

FOREIGN PATENTS

| Number | Country | Date |
|---|---|---|
| 472,094 | Germany | Feb. 22, 1929 |